July 21, 1942.  B. LEACH  2,290,340
CONCRETE BLOCK MOLD
Filed March 29, 1940   2 Sheets-Sheet 1

Inventor
Bruce Leach
By Arthur M. Hahn
Attorney

July 21, 1942.  B. LEACH  2,290,340
CONCRETE BLOCK MOLD
Filed March 29, 1940    2 Sheets-Sheet 2
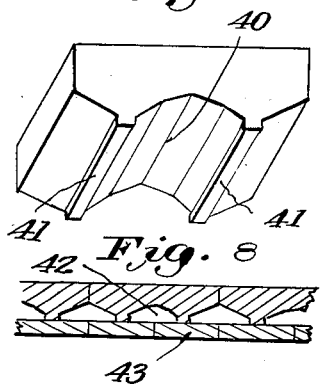
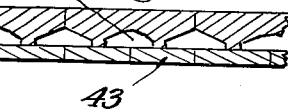
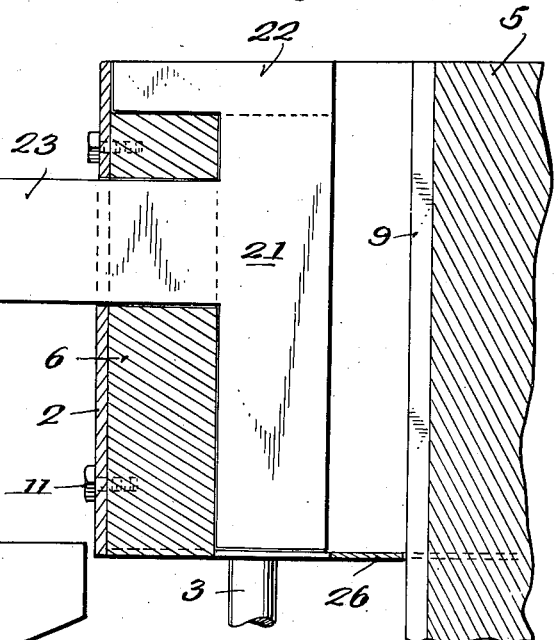
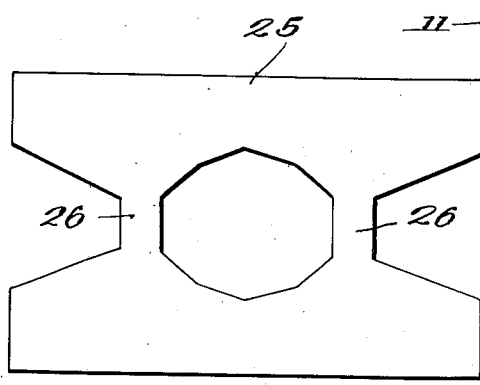
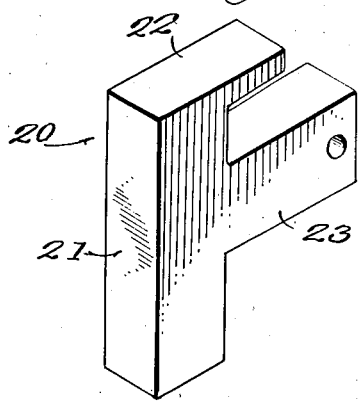
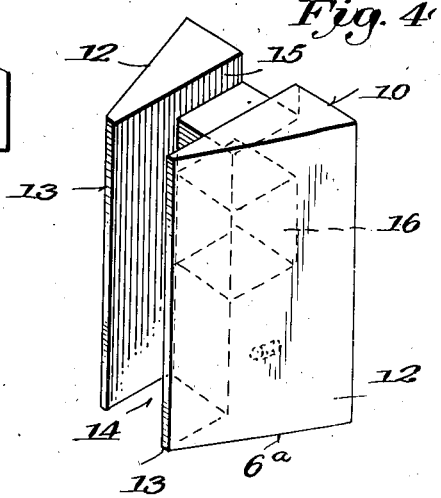
Inventor
Bruce Leach
By
Attorney Patented July 21, 1942

2,290,340

UNITED STATES PATENT OFFICE 2,290,340

CONCRETE BLOCK MOLD

Bruce Leach, Lemoyne, Pa.

Application March 29, 1940, Serial No. 326,740

7 Claims. (Cl. 25—119)

This invention relates to molding apparatus and has particular reference to a novel form of mold for making concrete backing blocks.

In my copending application Serial No. 237,120, filed October 26, 1938, I have disclosed a method and apparatus for making concrete blocks and as a part of the disclosure therein I have illustrated a concrete backing block and the manner of making the same. The present invention is directed to an improved apparatus for making this type of backing block and to the block per se, and insofar as the backing block is concerned, the present application constitutes a continuation-in-part of my aforementioned pending application.

The primary object of the present invention is to provide a novel form of molding apparatus for molding two backing blocks simultaneously, and which shall include core members that may be easily and quickly moved to molding position to receive the material from which the blocks are made, or similarly moved to a position whereby the two blocks may be quickly ejected from the mold.

Another object is to provide a molding apparatus of this character which shall consist of relatively few parts that are simple in construction, inexpensive to manufacture and which may be easily and quickly operated to produce a maximum number of molded blocks in a given period of time.

A further object is to provide a novel form of backing block for a building wall which shall be easy to place in position by the mason and which shall effectively prevent the transmission of moisture from the facing to the interior of the wall.

With the foregoing and other objects in view, the invention may be stated to consist in the various novel features of construction and arrangement or combination, all of which will be fully described hereinafter and pointed out in the appended claims.

In the drawings accompanying and forming a part of this application,

Figure 3 is a fragmentary vertical sectional view showing the core elements in position for ejecting the molded blocks;

Figures 4 and 5 are perspective views of two of the core elements removed from the mold;

Figure 6 is a top plan view of the pallet;

Figure 7 is a perspective view of one of the molded backing blocks; and

Figure 8 is a horizontal sectional view through a wall employing my improved backing blocks.

Figure 1:
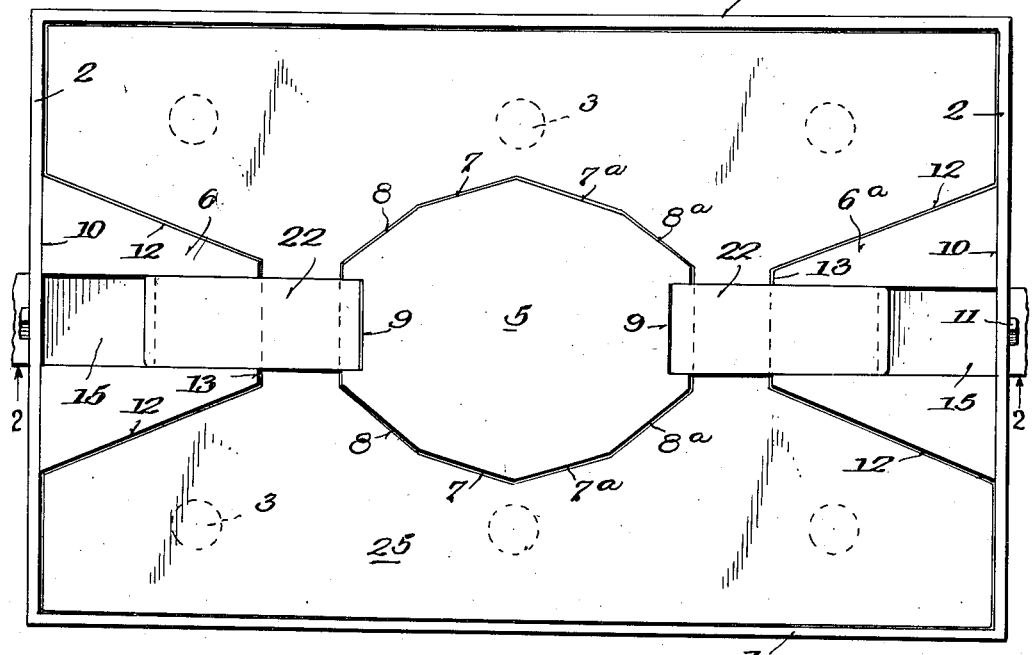
Figure 1 is a top plan view of a molding apparatus constructed in accordance with my invention and showing the core elements in molding position.

A molding apparatus constructed in accordance with my invention comprises the usual rectangular mold box having sides 1 and ends 2. These boxes are usually open at the top and bottom and are adapted to rest on, and be secured to a bed plate not shown, and through which project vertically movable stripper rods or fingers 3. A centrally located stationary core member 5 and two end stationary core members 6 and 6a are secured to the box.

Figure 2:
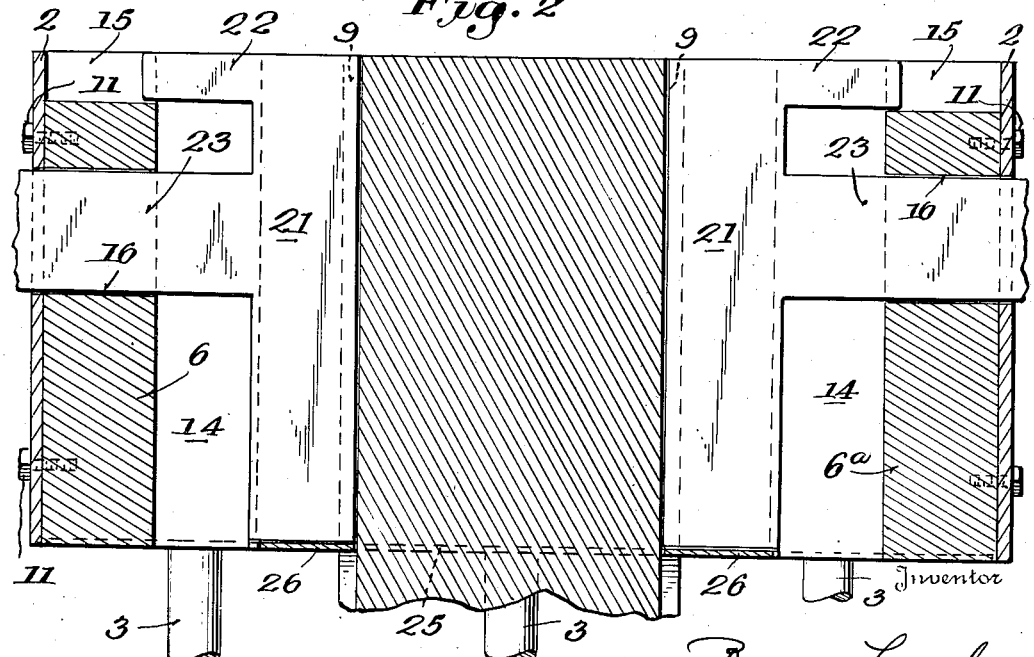
Figure 2 is a vertical sectional view taken on the line 2—2 of Figure 1.

The stationary core member 5 as shown in Figures 1 and 2, is in the form of a vertical post having oppositely sloping walls 7, 7a which defines a line at substantially the lateral axis of the post. These surfaces merge with more abruptly sloping surfaces 8 and 8a that extend to the end wall of the post. The end walls are each formed with a vertical groove 9 that is adapted to receive a movable core member to be described hereinafter. While I have shown and described the surfaces 7 and 8 and 7a and 8a as being substantially flat and angularly disposed to each other as seen in top plan view, it is obvious that these surfaces could be merged to form a single continuous curved surface if so desired.

The end stationary core members 6 and 6a are identical with each other and hence a description of one will serve for the other. Referring particularly to Figures 1, 2 and 4, it will be observed that in top plan view, each end core member is in the shape of a truncated triangle having a base surface 10 adapted to be fastened by bolts 11 or other suitable fastening means to the end walls 2 of the core box. The side walls 12 slope toward a front wall 13 which is formed with a vertical groove 14 and this groove is extended across the top of the member as indicated at 15. An aperture 16 substantially rectangular in cross section extends longitudinally through the core member.

Cooperating with the end stationary core members 6, 6a and central core member 5 are a pair of movable core members 20, each identical in construction and one of which is clearly shown in Figure 5. Each of these movable core members is substantially F-shaped in side elevation and comprises a vertical portion 21 that is adapted to seat in groove 14 of the stationary end core when in the retracted position as shown in Figure 3, and in the groove 9 of the central core 5 when in molding position as shown in Figures 1 and 2. Preferably integrally formed with vertical portion 21 are two longitudinally extending projections 22 and 23. Projection 22 is slidably mounted in groove 15 of the end core and projection 23 extends through aperture 16 therein and projects beyond the end wall of the mold box so that the sliding cores may be reciprocated to molding position or retracted by application of a horizontal force in either direction on these projecting ends.

In use, the movable cores 20 are retracted by pulling outwardly on each projecting end 23. The vertical portion 21 of each movable core is then in the position shown in Figure 3, that is, seated in groove 14 so that the front face thereof is flush with the face 13 of the stationary end core member.

A pallet 25 shown in Figure 6 is then placed in the bottom of the mold box. It will be noted that the webs 26 of the pallet lie in the space between the stationary end and central core members and the retraction of the movable core members permits the pallet to be readily placed in the mold box. After the pallet is in position, the movable core members 20 are moved to engage in the grooves 9 of the stationary core 5 as shown in Figures 1 and 2. This is easily accomplished by pushing inwardly on the projecting ends 23 of the movable core members. The mold box is then filled with concrete or other plastic and tamped in the usual manner, after which, the removable core members are retracted and the molded blocks are ejected in the usual or any approved manner by pushing upwardly on the stripper rods or fingers 3. The molded blocks on the pallet may then be removed and a new pallet inserted and the operation continued.

It will be observed that two backing blocks are formed for one cycle of operation of the mold box. Each of these backing blocks has a shape similar to that illustrated in Figure 7. A backing block such as illustrated in this figure is particularly favored by the mason laying the wall for several reasons. One of the prime reasons is that he can easily and quickly ascertain the central portion of the backing block by the line 40 and thus grasp the block from the top surface over this line. Thus, when he places the block in position on the wall in the bed of motor, the block will be balanced in his hand and will be placed horizontally and hence will require a minimum of truing up. Another important reason is that due to the angularly disposed inner surfaces between the projecting ribs 41, 41, a pocket or aperture 42 is provided for the hand of the mason when the block is positioned against the facing wall 43. Thus, there is no danger of mashing his fingers, or having to release his hold on the block before it is in position. It is thus evident that backing blocks of this shape can be accurately laid in a minimum of time and effort.

In addition to the above features, the block provides a substantially waterproof inner wall as the only points of contact between the backing blocks and the face of the wall are the ribs 41. If, due to extreme climatic conditions, it is desired to prevent the small absorption which may occur at these points, this may be easily accomplished by dipping or painting the ribs 41 with hot tar or other waterproofing material.

While the present invention is adapted primarily for blocks molded from concrete, it is obvious that it could be applied equally well to blocks molded from other materials such as glass or any of the plastics or similar materials.

What I claim is:

1. A mold for blocks comprising a core box having a plurality of stationary cores therein, each stationary core having a horizontal groove and an aperture and a vertical groove, and movable cores slidable longitudinally of the mold box, said movable cores being retractable to a position to provide a space between adjacent stationary cores and movable to another position to close said space, and each movable core being substantially F-shaped in side elevation with its horizontal arms movable in the horizontal groove and aperture and the vertical portion seating in the vertical groove.

2. A mold for blocks comprising a core box having a plurality of stationary cores therein arranged in longitudinally spaced relation, each stationary core having a horizontal groove and an aperture and a vertical groove, and movable cores interposed between adjacent stationary cores, said movable cores each being retractable into one of said stationary cores to provide a space between adjacent stationary cores and movable to another position to close said space, and each movable core being substantially F-shaped in side elevation with its horizontal arms movable in the horizontal groove and aperture and the vertical portion seating in the vertical groove.

3. A mold for blocks comprising a core box having two end stationary cores and a central stationary core spaced from each of said end cores, said central stationary core having a pair of vertical grooves therein, a pair of movable cores interposed between said end cores and said central core, said end cores each having a recess to receive its movable core when in retracted position, said movable cores being slidable longitudinally of the mold box to close the space between said end cores and said central core and projecting into the vertical grooves.

4. A mold for blocks comprising a core box having two end stationary cores and a central stationary core spaced from each of said end cores, a pair of movable cores interposed between said end cores and said central core, said end cores each having recesses to receive and slidably support its movable core when in retracted position thereby to provide a space with respect to said central core, said movable cores being slidable longitudinally of the mold box in the recesses of the end cores to close the space between said end cores and said central core, said central core and said movable cores having interengaging means to align all of said cores in the mold box.

5. A mold for blocks comprising a core box having two end stationary cores and a central stationary core spaced from each of said end cores, said end cores each having a vertical groove formed therein and said central stationary core having a pair of vertical grooves therein, a movable core slidably mounted in each groove of the end cores and having a portion projecting through an aperture in its end core and the core box whereby said movable core may be actuated from the exterior of said core box, said movable cores each being retractable into said groove to provide a space between said end core and central core and movable to engage in the grooves in said central core and close said space.

6. A mold for blocks comprising a core box having two end stationary cores and a central stationary core spaced from each of said end cores, said end cores each having a vertical groove and horizontal guideway formed therein, and said central stationary core having a pair of vertical grooves therein, a movable core member having a vertically disposed portion and a horizontally disposed element slidably mounted respectively in said groove and said guide, a horizontally disposed arm connected with said vertically disposed portion and projecting through an aperture in said end core and core box whereby said movable core may be actuated from the exterior of said core box, said movable cores each being retractable into said groove in the end core to provide a space between said end core and central core and movable to engage said central core and close said space by projecting into the vertical groove in the central core.

7. In a mold for blocks, a core structure comprising a stationary core having two grooves and an aperture therein, and a movable core having a main portion retractable in one of the grooves and two projecting portions slidable in the other groove and the aperture.

BRUCE LEACH.